(12) United States Patent
Faulkner

(10) Patent No.: US 9,807,341 B2
(45) Date of Patent: Oct. 31, 2017

(54) COMMUNICATION EVENT

(71) Applicant: Microsoft Technology Licensing, LLC, Redmond, WA (US)

(72) Inventor: Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/048,750

(22) Filed: Feb. 19, 2016

(65) Prior Publication Data

US 2017/0244930 A1  Aug. 24, 2017

(51) Int. Cl.
*H04N 7/15* (2006.01)
*H04N 7/14* (2006.01)

(52) U.S. Cl.
CPC .................. *H04N 7/147* (2013.01)

(58) Field of Classification Search
CPC ...... H04N 7/15; H04N 7/147; H04N 21/4406; H04N 21/23424; H04N 7/14
USPC .......................................... 348/14.01–14.16
See application file for complete search history.

(56) References Cited

U.S. PATENT DOCUMENTS

| | | | |
|---|---|---|---|
| 8,310,521 B2 | 11/2012 | Zhang et al. | |
| 8,432,431 B2 | 4/2013 | Gorzynski et al. | |
| 9,041,766 B1 | 5/2015 | Gates et al. | |
| 2005/0131744 A1 | 6/2005 | Brown et al. | |
| 2006/0171336 A1* | 8/2006 | MacDonald | H04N 7/152 370/260 |
| 2006/0251382 A1 | 11/2006 | Vronay et al. | |
| 2009/0079816 A1 | 3/2009 | Qvarfordt et al. | |
| 2010/0220172 A1* | 9/2010 | Michaelis | H04N 7/147 348/14.08 |
| 2010/0253689 A1 | 10/2010 | Dinicola et al. | |
| 2013/0216206 A1 | 8/2013 | Dubin et al. | |
| 2013/0288212 A1 | 10/2013 | Bist | |
| 2014/0085404 A1* | 3/2014 | Kleinsteiber | H04N 7/15 348/14.08 |

(Continued)

FOREIGN PATENT DOCUMENTS

WO   WO-2013015816   1/2013

OTHER PUBLICATIONS

"Easy-Access Web Meeting with Video Conferencing", Available at: http://www.uniteconferencing.com/solutions/video/easy-access-web-meeting-with-video-conferencing, Dec. 9, 2014, 2 pages.

(Continued)

*Primary Examiner* — Melur Ramakrishnaiah

(57) ABSTRACT

In a communication event between a first user and one or more second users via a communication network, a plurality of video streams is received via the network. Each of the streams carries a moving image of at least one respective user. The moving image of a first of the video streams is displayed at a user device of the first user for a first time interval. In the moving image of a second of the video streams that is not displayed at the user device in the first time interval, a human feature of the respective user is identified. A movement of the identified human feature during the first time interval that matches one of a plurality of expected movements is detected. In response to the detected movement, at least the moving image of the second video stream is displayed at the user device for a second time interval.

20 Claims, 13 Drawing Sheets

(56) References Cited

U.S. PATENT DOCUMENTS

2014/0184731 A1\* 7/2014 Bebbington ......... H04N 19/139
  348/14.09

OTHER PUBLICATIONS

Byun,"Honest Signals in Video Conferencing", In Proceedings of the IEEE International Conference on Multimedia and Expo, Jul. 11, 2011, 6 pages.

"International Search Report and Written Opinion", Application No. PCT/US2017/017280, dated Apr. 21, 2017, 13 pages.

\* cited by examiner

| Movement | Priority | Time Interval | Other parameters |
|---|---|---|---|
| M1 | P1 | T1 | X1 |
| M2 | P2 | T2 | X2 |
| M3 | P3 | T3 | X3 |
| ... | ... | ... | ... |

FIG. 4

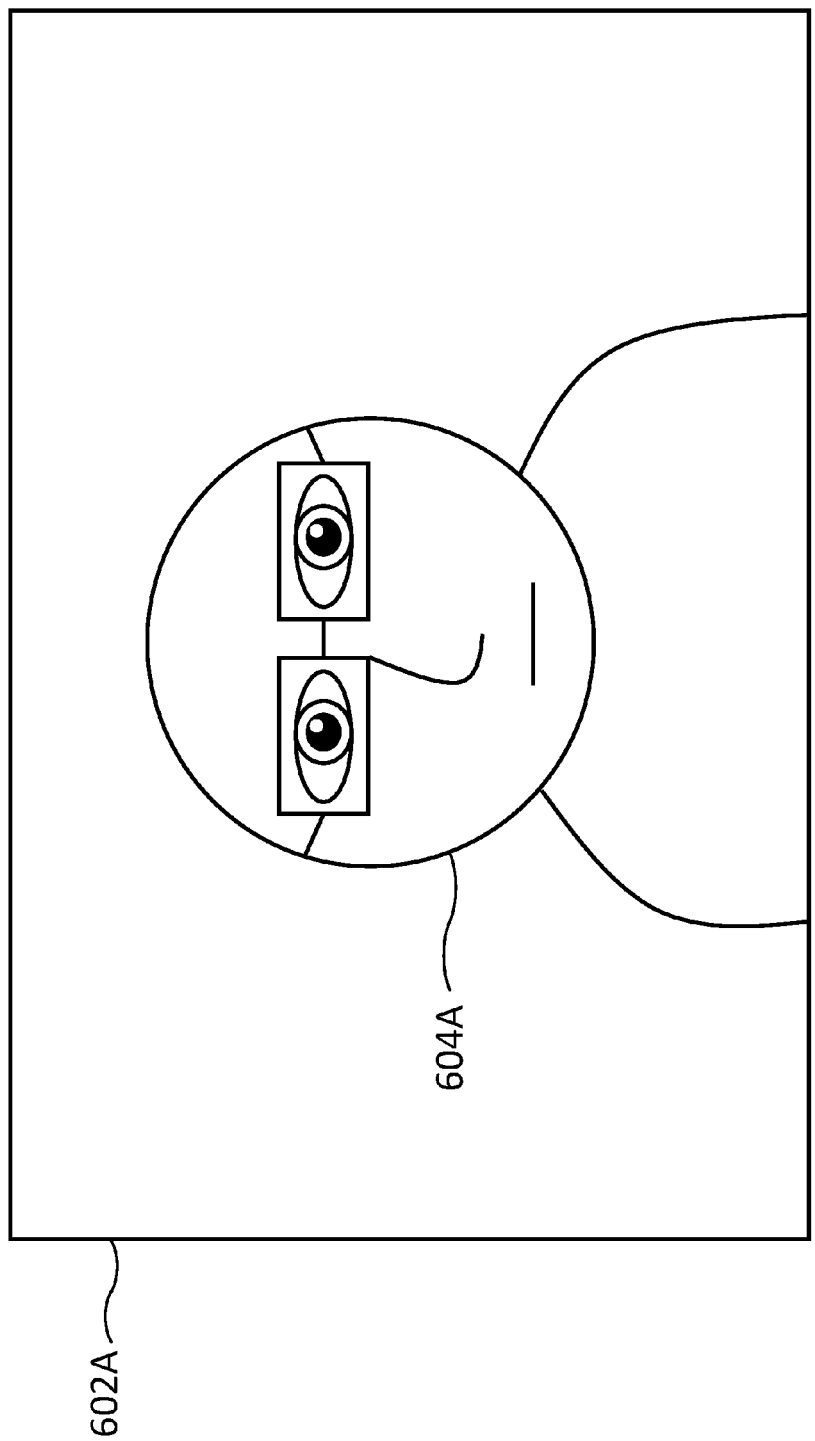

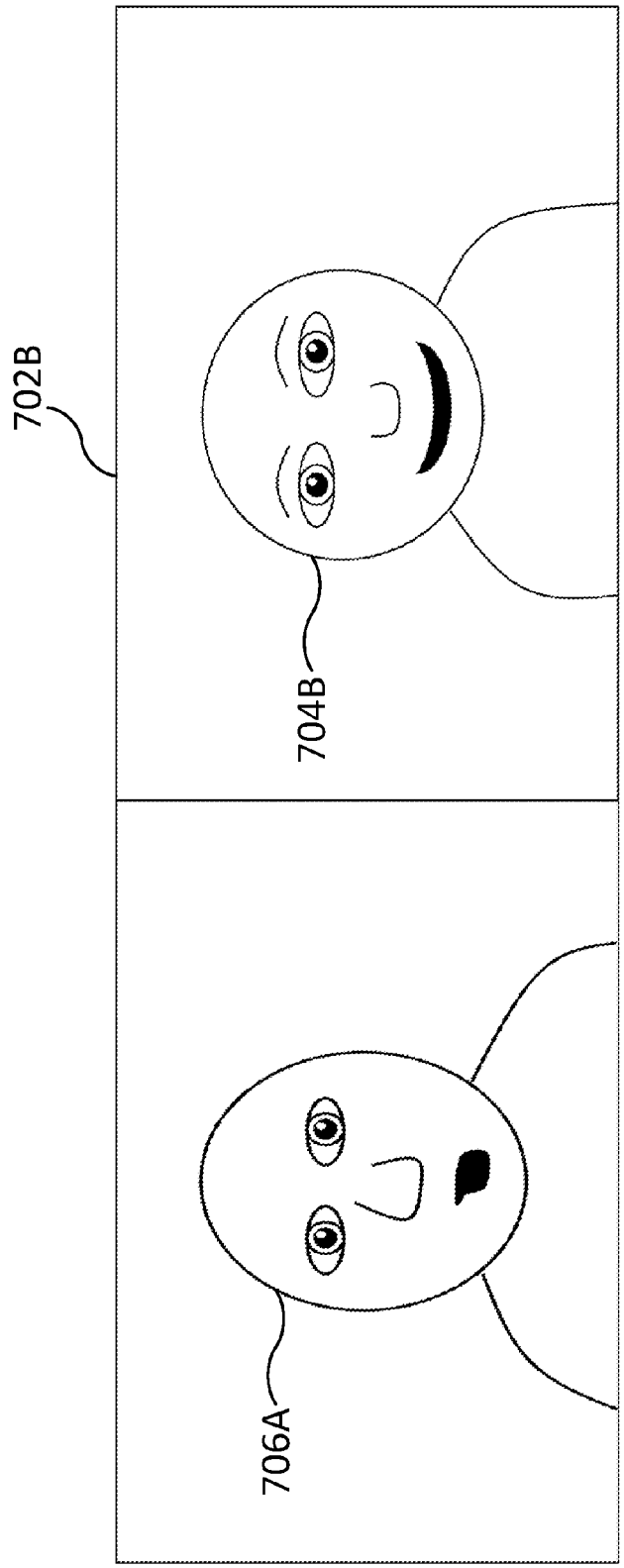

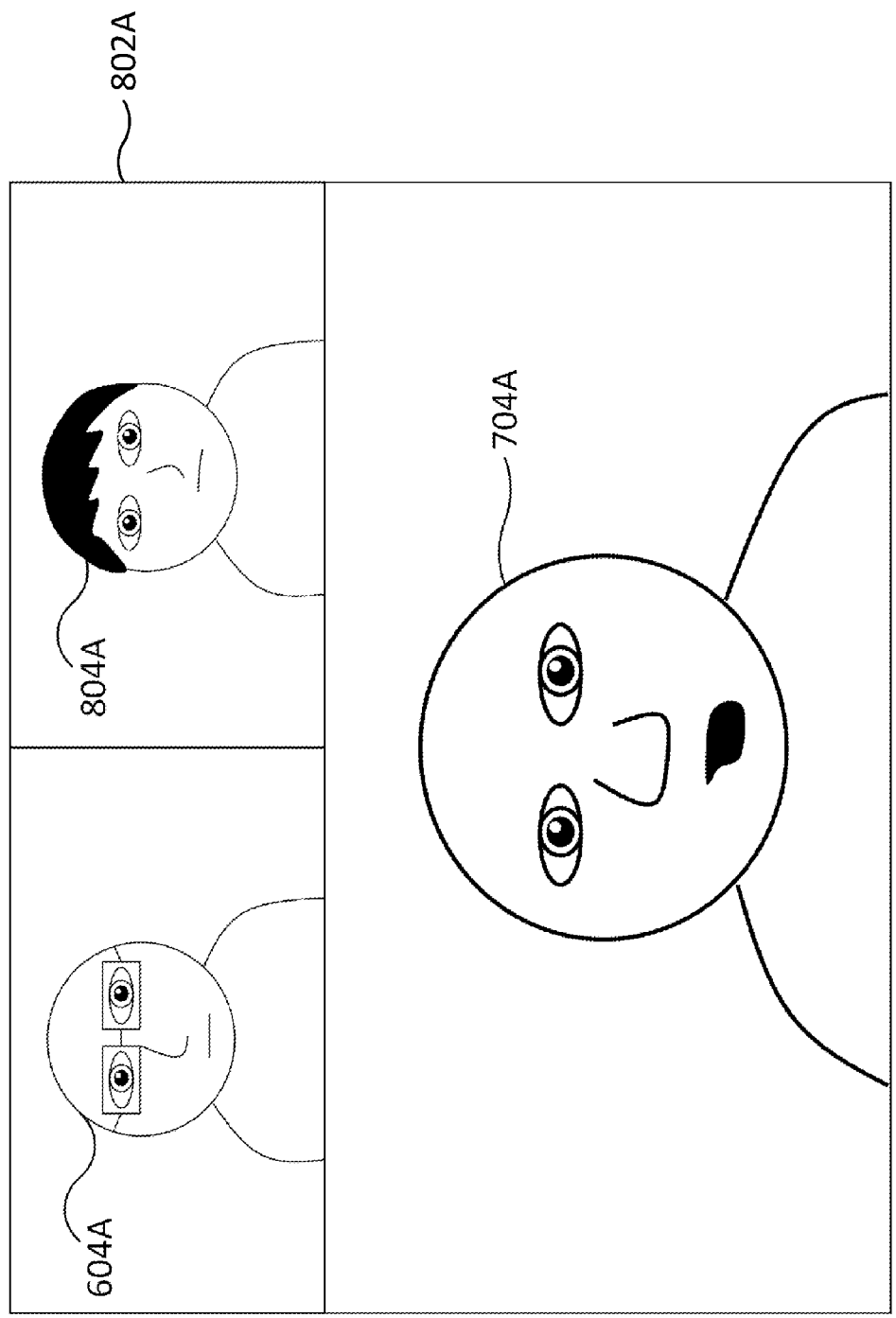

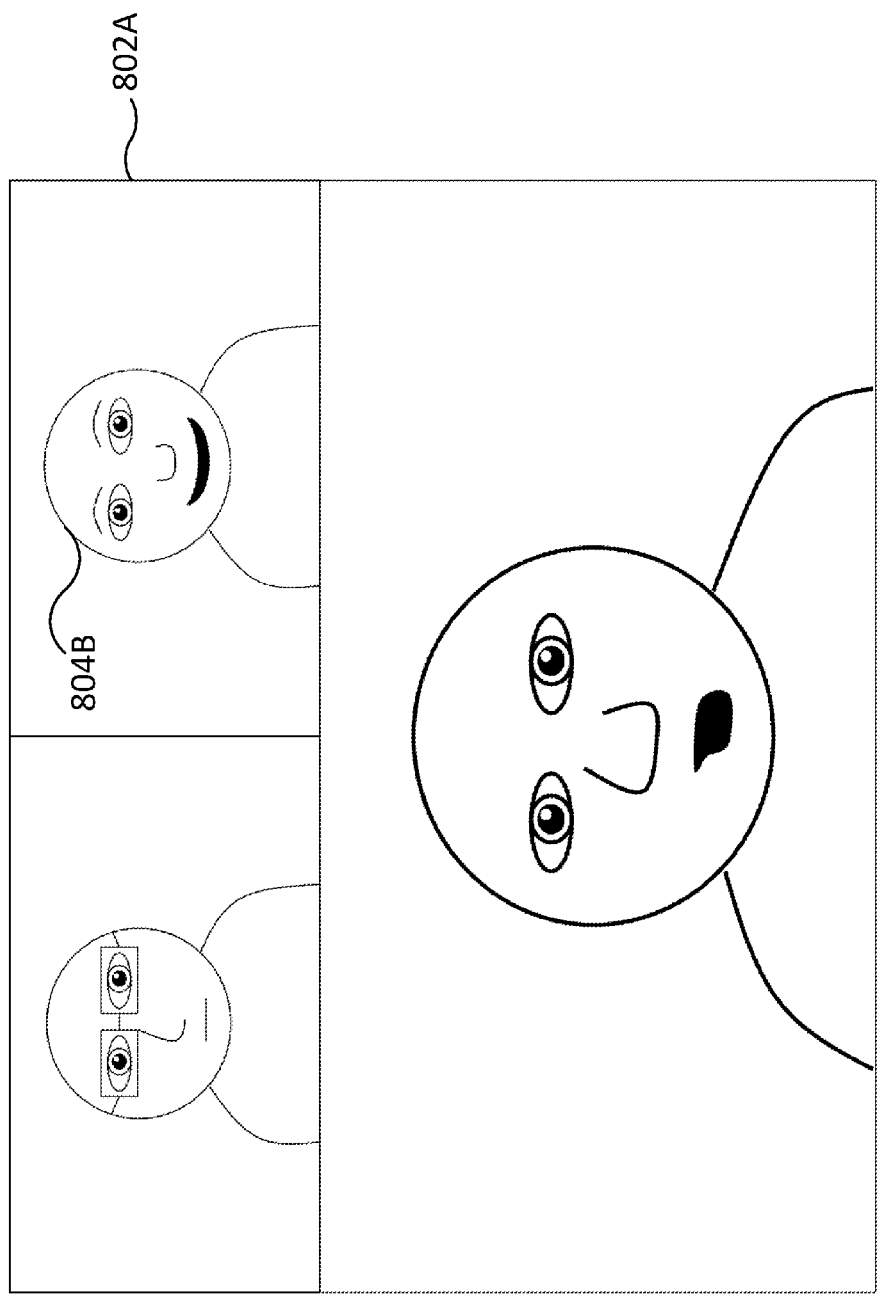

COMMUNICATION EVENT

BACKGROUND

Voice over internet protocol ("VoIP") communication systems allow the user of a device to make calls across a communication network. To use VoIP, the user must install and execute client software on their device. The client software provides the VoIP connections as well as other functions such as registration and authentication. Advantageously, in addition to voice and video communication, the client may also provide video calling and instant messaging ("IM"). With video calling, the callers are able to view video images (i.e. moving images) of the other party in addition to voice information. This enables a much more natural communication between the parties, as facial expressions are also communicated, thereby making video calls more comparable to a face-to-face conversation.

A video call comprising multiple users may be referred to as a "video conference". In a conventional video conference, each participant (i.e. user) is able to view the video images of one or more of the other participants (users) in the video conference. For example, as a default setting, each user may be presented with the video images of all of the other users in the video conference. These may displayed, for example, using a grid, with each video image occupying a different location on the grid. Alternatively, each user may be presented with one or more video images corresponding to users that have been detected as speaking users. That is, the detection of audio from a speaker may determine which of the video images of the other users are selected for display at a particular user's user terminal. Typically, in a video conference, one user speaks at a time, and so this may result in a single video image of that user being displayed to each of the non-speaking users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various aspects of the present subject matter relate to a communication event between a first user and one or more second users via a communication network. A plurality of video streams is received via the network at a computer connected to the network. Each of the streams carries a respective moving image of at least one respective user. The computer causes the respective moving image of a first of the video streams to be displayed at a user device of the first user for a first time interval. The computer identifies, in the respective moving image of a second of the video streams that is not displayed at the user device in the first time interval, a human feature of the respective user. The computer detects a movement of the identified human feature during the first time interval that matches one of a plurality of expected movements. In response to the detected movement, the computer causes at least the respective moving image of the second video stream to be displayed at the user device for a second time interval.

DESCRIPTION OF FIGURES

For a better understanding of the present subject matter, and to show how the same may be carried into effect, reference is made to the following figures in which:

FIG. 4 shows a schematic illustration of a computer implemented database;
FIGS. 6A, 6B, 6C, 7A, 7B, 8A, and 8B show various illustrations of a graphical user interface of a client, at different stages during a video call between a group of three or more users.

DESCRIPTION OF EMBODIMENTS

Figure 1:
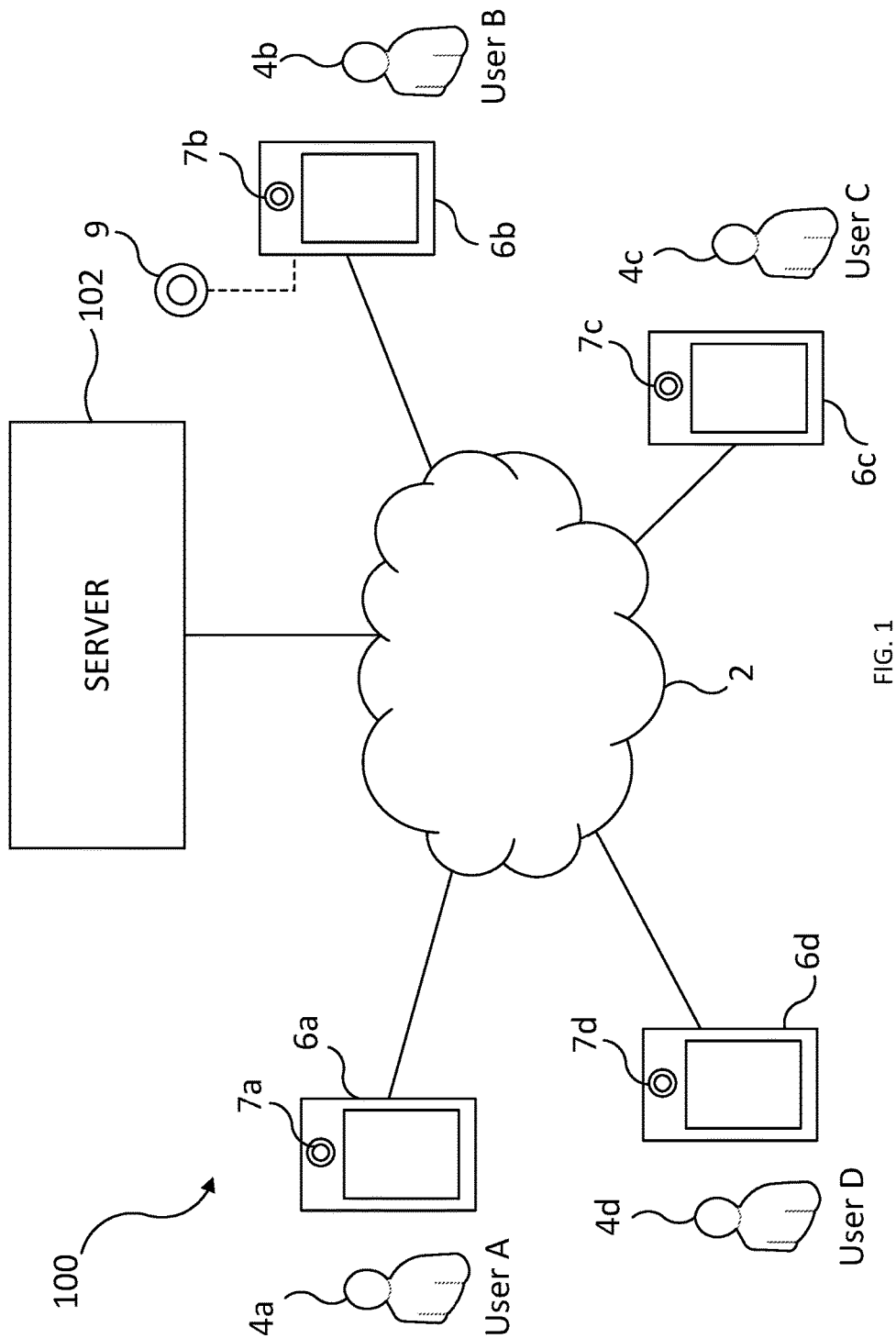
FIG. 1 shows a schematic block diagram of a communication system.

In a video conference conducted via a communication network, it may not always be desirable to display all of the video images of the other users in the videoconference, to a particular user. This may be the case, for example, where only a few of the users are active—i.e. doing something that may be of interest to one or more of the other users in the videoconference and/or if there is a very large number of users on the call. For example, only one or two of the users may be speaking users. It may be desirable to prevent the video images associated with the remaining users, i.e. the inactive users, from being displayed at a user's terminal. This ensures that the user terminal does not allocate display resources to video data that does not add to the user's experience of the video conference. This is particularly, though not exclusively applicable, to mobile, tablet or certain laptop devices within limited available display areas. It may also in some cases ensure that network-bandwidth is not allocated to transmitting the video streams associated with inactive users to other user terminals unnecessarily, as discussed in further detail below.

This is referred to herein as "follow the action storytelling", and guides the consuming participants with the group activity and group response as the communication event proceeds. Currently, with active speaking video conferences, the consuming participants may need to monitor multiple video feeds at once to determine where non-verbal activity is occurring. Alternatively, if they are only viewing an active speaker they may not be aware of non-verbal changes in the group activity due to the absence of any suitable visual representation being presented to them. In storied experiences video may be displayed or sequenced due to the current action at hand. For "follow the action" storytelling, a combination of multi video grids and single video grids can be used, depending on the size of the group activity and the number of sensors capturing the event.

It may not always be desirable to only display video images of users that are identified as speaking (i.e displaying video images based exclusively on the detection of verbal events). For example, a user may be interested in a non-verbal event associated with one or more of the other users. This may include, for example, a change in the facial expression of one or more of the other users, which may have occurred as a result of one of the users reacting to a speaking user's speech. It may be desirable to display one or more of these reactions, as and when they occur, so as to enable a user to view the activity of the other users in the video conference, in a story-like manner. These reactions may be displayed for a limited time interval; for example, to ensure that a user's focus is not taken away from a speaking user for too long.

Furthermore, given that a non-verbal event is not associated with audio data (i.e. there is no speech to detect), it may not be desirable to replace both the audio and video data associated with a speaking user, with that of a user associated with a non-verbal event. For example, it may be desirable to ensure that a speaking user's speech is still played out at a user's user terminal, even if the video image that is being displayed at that user's user terminal, does not correspond to the video image of the speaking user (e.g. if the video image corresponds to a user reacting to the speaking user's speech). Treating the audio and video data in this way ensures story continuity of the group experience—i.e. that a user's focus is brought to the relevant audio and video data, at the right time in the video conference.

The present disclosure addresses these issues by providing a communication system that causes one or more video images of a video conference to be displayed at a user terminal in a virtual "Storied Experience View". The virtual "Storied Experience View" harnesses the power of video and storytelling to transform a meeting experience (i.e. video conference) beyond active speaking via a more engaging and life-like meet up experience.

The Storied Experience View may comprise a single streaming video grid or a multi-streaming video grid where multiple videos and or audio channels play at one time. By displaying video images in the Storied Experience View, users are able to consume the most engaging and telling story of group activity, i.e. without having to monitor all of the video images of all of the other users in the video conference, in order to determine where non-verbal user activity is occurring. In the Storied Experience View, video may be displayed or sequenced due to the current action at hand using a combination of multiple video grids and single video grids depending on the size of the group activity and the number of sensors capturing the event.

In the present disclosure, one computer receives all of the video streams from each of the respective users, via the network so that an intelligent decision about which to display can be made taking into account all of their visual content. The computer has visibility of all of the candidate streams and is able to limit the number of these that are selected for display at a particular user terminal, taking into account non-verbal events i.e. changes in the visual content of the moving images carried by the streams. Because the computer receives all of the video streams via the network, it is best placed to make intelligent decisions about which video streams to select. Limiting the number of video streams in this way is useful, where, for example, a user terminal has a limited display area. In such a case, it may not be meaningful to display all of the video images of the other users in the video conference, at that user terminal (particularly if the video conference has a large number of participants). The computer receiving the streams is able to work within the confines of the limited display area whilst maximizing the information that is delivered to the consuming user.

This is particularly, though not exclusively, the case where at least two of the video streams are received from different clients running on different client devices as each individual client is not necessarily aware of the visual content of the other client's video stream(s).

In the described embodiments, the computer is embodied in a central server. This allows bandwidth to be saved, as the only the stream(s) selected for displaying to any given client need to be transmitted to that client from the server. In this way, the server is able to use bandwidth efficiently, whilst maximising the amount of useful and/or engaging information that is conveyed to a consuming user. In the present disclosure, a duration timer is assigned to non-verbal singular events. Upon detection of a non-verbal event the video is promoted and assigned a duration and priority in the active video stack of the live story view sequence during a video call, providing activity awareness of the group non-verbal communication to the remote consuming attendees video sequence for playback.

The present disclosure allows virtual attendees during live playback of video based meet up experiences to track participant non-verbal communication activity and awareness during the story video view experience on the stage. A duration is assigned to the non-verbal communication priority item for story view experiences, resulting in a right place and right time for the activity to surface in the story view. This increases participant engagement, activity and spatial awareness of the users.

In addition to live video in video calls, the present techniques may also be applied to recorded video of such calls at a later time.

Herein, references to users being currently "visible" in a moving image (or similar) carried by a video stream does not necessarily mean that the video image is currently being viewed. A user can be visible in a moving image that is not currently being displayed, in the sense that they are detectable in the visual content of that image based on computer-implemented image processing applied to the moving image, such as facial or skeleton tracking applied to the image by a computer. The visual content of a moving image means information that is conveyed by pixel values of the moving image, and which would thus be conveyed to a viewer were that moving image to be displayed (i.e. played out) to him. Thus, in accordance with the present techniques, it is ultimately changes in those pixel values—and in particular a change in the information that is conveyed by the changing pixel values—that causes certain video images to be selected for displaying for appropriately chosen intervals to convey the information change to one or more call participants. Each such change in the information conveyed by the visual content of a moving image is referred to individually herein as a "non-verbal singular event", which includes for example changes in the number of users in the moving image and certain expected (i.e. recognizable) movements by a user in the moving image.

A moving image is also referred to herein as a "video image", and means a sequence of frames (i.e. static images) to be played out in quick succession to give the impression of movement. Unless otherwise indicated, any references to "an image" below denote a moving image in this sense, rather than a static image. References to "displaying a video stream" mean displaying the moving image carried by that video stream.

FIG. 1 shows a communication system 100 comprising a first user 4a (User A) who is associated with a first user terminal 6a, a second user 4b (User B) who is associated with a second user terminal 6b, a third user 4c (User C) associated with a third user terminal 6c and a fourth user 4d (User D) associated with a fourth user terminal 6d. Whilst only four users have been shown in FIG. 1, it will be appreciated that the communication system 100 may comprise any number of users and associated user devices. It will also be appreciated that, whilst each user terminal 6 is shown with an associated camera device, 7, one or more of the user terminals may be associated with one or more additional cameras or sensors (e.g. microphone array, Kinect etc.), thereby allowing more streams of input from that location. For example, user terminal 6b is shown to have an additional camera device 9. The additional camera device 9 may provide an alternative angle from which to capture a video image of user 4b (and/or user 4e).

More generally, one or more peripheral devices, such as external cameras, audio mics, motion sensors etc. may be connected to the network. These can be checked in or added to a specific parent device location via Bluetooth, WiFi, network login etc. These peripheral devices may act as added sensors or user preference inputs. Sensor coverage (i.e. the time at which particular sensors are activated) may be constrained so as to cover a storied event at the right place and time. For example, a standard type of stored experience may include "chapters" or "phases"; phases such as "start", "story", "end", "manage" and "relive". These chapters or phases may be used to manage the priorities and coverage of behaviour so as to ensure that such behaviour is captured at the appropriate times.

The user terminals 6a, 6b, 6c and 6d can communicate over the network 2 in the communication system 100, thereby allowing the users 4a, 4b, 4c and 4d to communicate with each other over the network 2. The network 2 may be any suitable network that has the ability to provide a communication channel between user terminals 6a, 6b, 6c and 6d. For example, the network 2 may be the Internet or another type of network such as a High data rate mobile network, such as a 3rd generation ("3G") mobile network.

The user terminals 6a, 6b, 6c and 6d can be any type of user device such as, for example, a mobile phone, a personal digital assistant ("PDA"), a personal computer ("PC") (including, for example, Windows™, Mac OS™ and Linux™ PCs), a gaming device (Xbox), a group room meeting device (e.g. Surface Hub) or other embedded device able to connect to the network 106. Each user terminal is arranged to receive information from and output information to one or more of the other user terminals. In one embodiment, each user terminal comprises a display such as a screen and an input device such as a keypad, a touch-screen, camera device and/or a microphone.

User terminals 6a, 6b, 6c and 6d each execute a communication client application provided by a software provider associated with the communication system. The communication client application is a software program executed on a local processor in the respective user terminal. The communication client application performs the processing required at the respective user terminal in order for each user terminal to transmit and receive video data (carried in the form of video streams) over the network 2. Each user terminal is connected to the network 2.

The communication client application is a videoconferencing application that enables users 4a, 4b, 4c and 4d to participate in a video conference. The communication client application provides a means through which each user can share any video data captured at their user device (e.g. by an associated camera device, such as those shown at 7a, 7b, 7c and 7d of FIG. 1) with one or more of the other users. The communication client application also provides a means through which each user can receive, at their respective user terminal, the video data captured by the other participants of the video conference.

For example, a user, such as user A, may initiate the video conference by transmitting a request to one or more other users, such as users B, C and D. Upon accepting the request from user A, users B, C and D may each receive video data from user A, and transmit their own video data to each of the other users that have agreed to partake in the video conference. For example, user B may receive the video data captured by one or more of users A, C and D.

Groups of people (i.e. users) may also be detected and identified at a single location or via single or multiple devices. This is important for improving group awareness and coverage from a single location into the virtual storied experience. This also ensures that all of the distributed people (users) and groups of people (users) are fully engaged and aware of everyone's presence.

Connected to the network 2 is a control server 102 arranged to receive video streams from one or more user terminals (e.g. user terminals 6a, 6b and 6c) and to determine one or more other user terminals (e.g. user terminal 6d) to transmit one or more of the received video streams to. The control server 102 may be implemented on a single computing device. The control server 102 may also operate to support performance of the relevant operations in a "cloud computing" environment whereby at least some of the operations may be performed by a plurality of computing devices.

User terminals 6a, 6b and 6c may correspond to user terminal 6d (which, in the following examples, is described as a "receiving terminal"). The user terminal 6d executes, on a local processor, a communication client which corresponds to the communication client executed at the user terminals 6a, 6b and 6c. The client at the user terminal 6d performs the processing required to allow the user 4d to communicate over the network 2 in the same way that the clients at user terminals 6a, 6b and 6c perform the processing required to allow the users 4a, 4b and 4c to communicate over the network 2. The user terminals 6a, 6b, 6c and 6d are end points in the communication system. FIG. 1 shows only four users (4a, 4b, 4c and 4d) and four user terminals (6a, 6b, 6c and 6d) for clarity, but many more users and user devices may be included in the communication system 100, and may communicate over the communication system 100 using respective communication clients executed on the respective user devices, as is known in the art.

Figure 2:
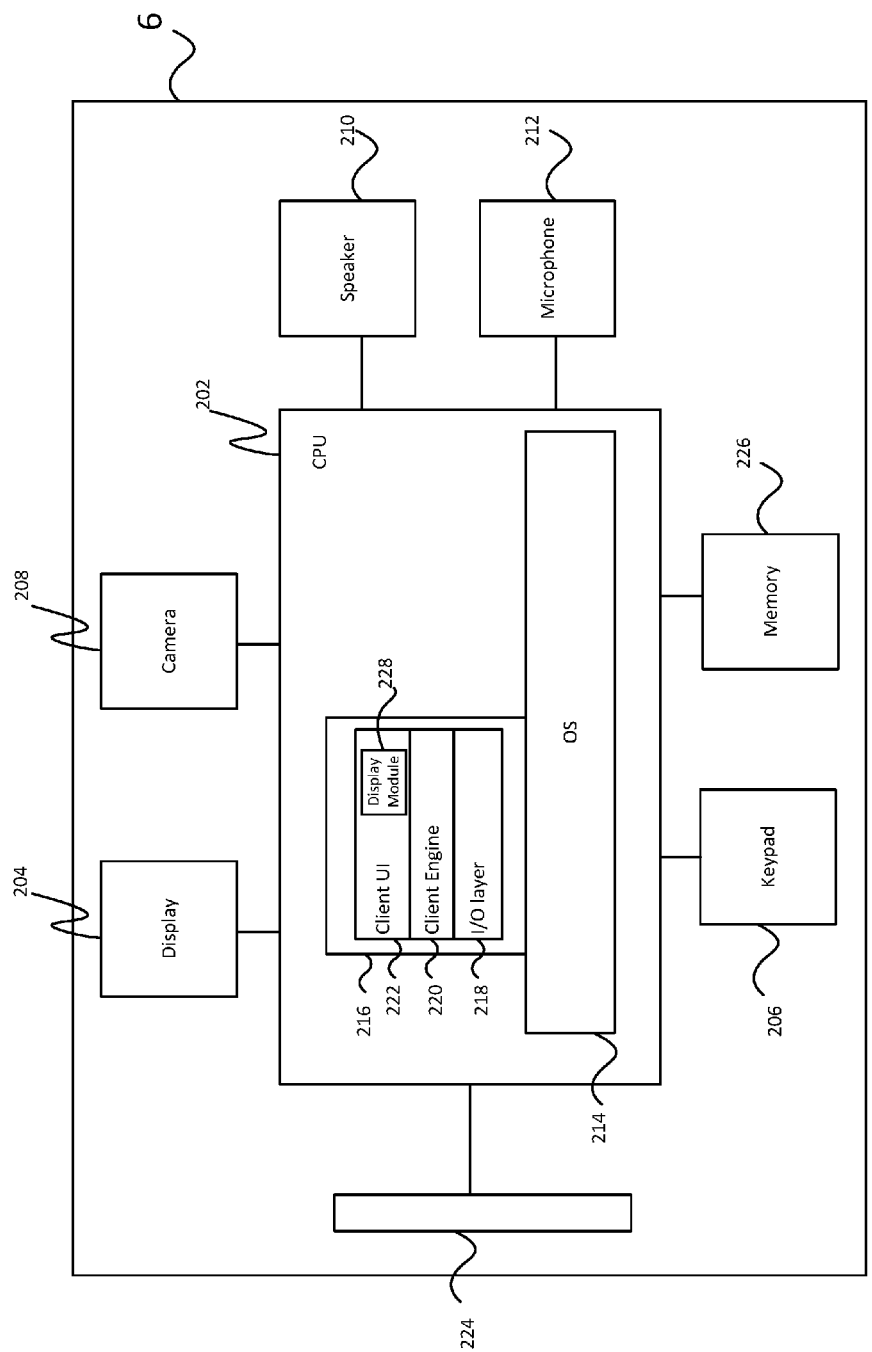
FIG. 2 shows a schematic block diagram of a user device.

FIG. 2 illustrates a detailed view of the user terminal 6 on which is executed a communication client for communicating over the communication system 100. The user terminal 6 comprises a central processing unit ("CPU") 202, to which is connected a display 204 such as a screen or touch screen, input devices such as a keypad 206 and a camera 208. An output audio device 210 (e.g. a speaker) and an input audio device 212 (e.g. a microphone) are connected to the CPU 202. One or more additional sensors (not shown) such as a "Kinect" device or Mixed Reality device such as "Hololens" may also be connected to the CPU 202. The display 204, keypad 206, camera 208, output audio device 210, input audio device 212 and additional sensors may be integrated into the user terminal 6 as shown in FIG. 2. In alternative user terminals one or more of the display 204, the keypad 206, the camera 208, the output audio device 210, the input audio device 212 and the additional sensors may not be integrated into the user terminal 6 and may be connected to the CPU 202 via respective interfaces. One example of such an interface is a USB interface. The CPU 202 is connected to a network interface 224 such as a modem for communication with the network 106. The network interface 224 may be integrated into the user terminal 6 as shown in FIG. 2. In alternative user terminals the network interface 224 is not integrated into the user terminal 102. The user terminal 102 also comprises a memory 226 for storing data as is known in the art. The memory 226 may be a permanent memory, such as ROM. The memory 226 may alternatively be a temporary memory, such as RAM.

FIG. 2 also illustrates an operating system ("OS") 214 executed on the CPU 202. Running on top of the OS 214 is a software stack 216 for the communication client application referred to above. The software stack shows an I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network 2 via the network interface 224. The I/O layer 218 comprises audio and/or video codecs which receive incoming encoded streams and decodes them for output to speaker 210 and/or display 204 as appropriate, and which receive unencoded audio and/or video data from the microphone 212 and/or camera 208 and encodes them for transmission as streams to other end-user terminals of the communication system 100. The client engine layer 220 handles the connection management functions of the VoIP system as discussed above, such as establishing calls or other connections by server-based or P2P address look-up and authentication. The client engine may also be responsible for other secondary functions not discussed herein. The client engine layer 220 also communicates with the client user interface layer 222. The client engine layer 220 may be arranged to control the client user interface layer 222 to present information to the user of the user terminal 200 via the user interface of the client which is displayed on the display 204 and to receive information from the user the user terminal 200 via the user interface.

A display module 228 of the UI layer 222 is shown. The display module 228 determines the manner in which any video streams received over the network (via the network interface) are displayed at the display of the user terminal 6. For example, the display module may receive layout parameters from the network interface, and use these to generate, or select, a particular layout for displaying the one or more video streams.

The display module may also receive data relating to the video streams themselves, such as, for example an associated priority value. The display module may use the priority value associated with a video stream to determine the duration for which that video stream shall be displayed at the user terminal 6 and/or where, within a predetermined layout, the video stream will be displayed.

Figure 3:
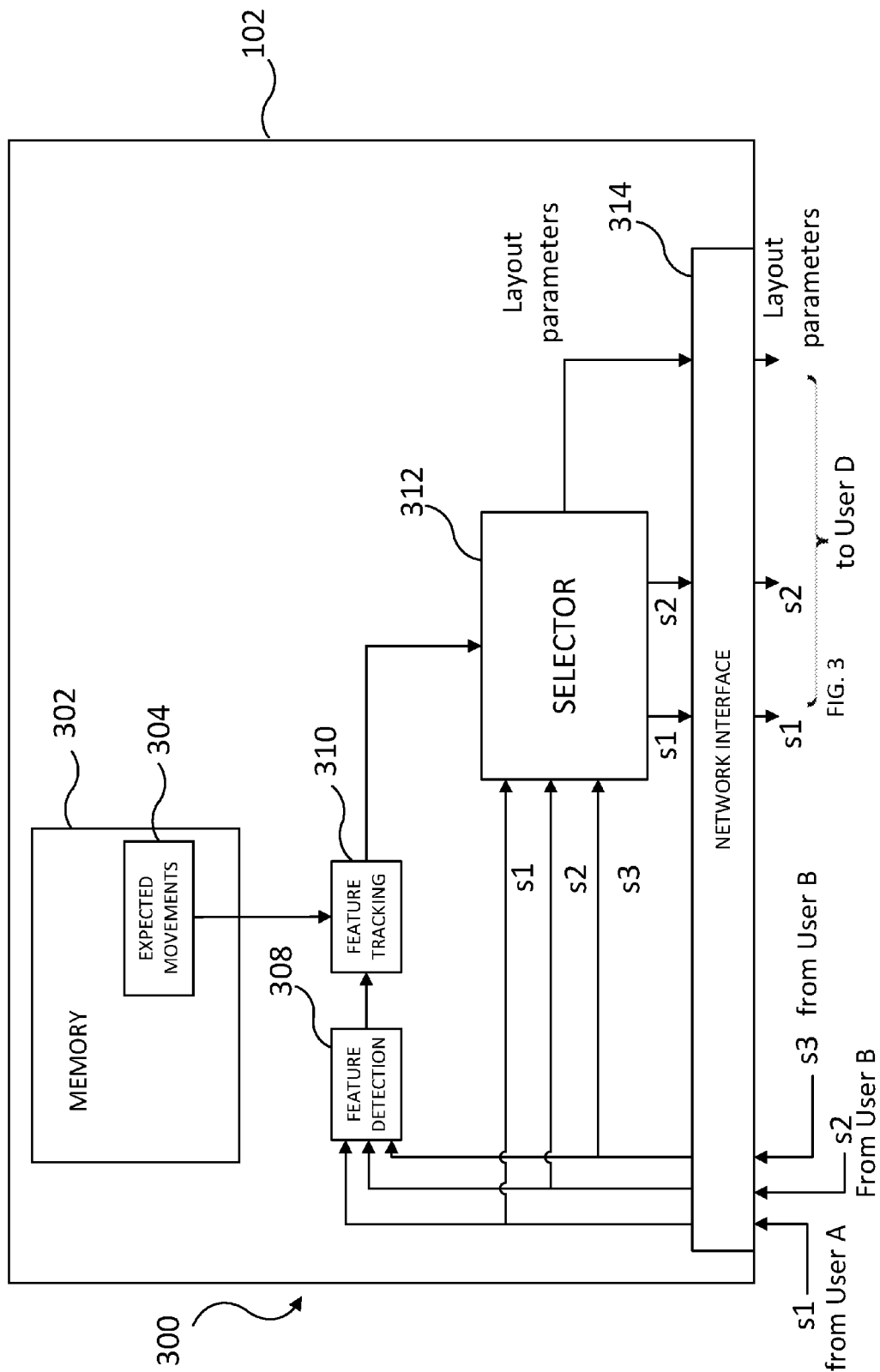
FIG. 3 shows a functional block diagram of a server.

FIG. 3 illustrates a more detailed view of the control server 102 shown in FIG. 1.

As can be seen in FIG. 3, the control server comprises a network interface 314 for receiving and transmitting video streams from and to other user terminals, over the communications network 2.

FIG. 3 corresponds to the control server of FIG. 1, where users A, B, C and D are participants of a video conference.

For the sake of conciseness, the control server shown in FIG. 3 is described from the perspective of determining which of the users, users A, B and C, to display to a receiving user, User D. While stream s4 (the stream associated with user D) is not shown as an input to the control server, it will be appreciated that stream s4 may also be an input to the control server, and the control server may determine for each individual user (i.e. users A, B, C and D), which of the other users (and their associated video streams) to display to that user.

In the example shown in FIG. 3, video streams s1, s2 and s3 are received at the network interface from user terminals 6a, 6b and 6c respectively (each carrying a moving image of users A, B and C respectively). As a result of the operations performed by selector 312 (described later), streams s1 and s2 are selected and transmitted, via the network interface, to User D's user terminal 6d, herein referred to more generally as the "receiving terminal".

It should be noted that in alternative embodiments, two or more of the video streams may be received from a single camera device (i.e. there is not necessarily a one-to-one mapping between camera devices and video streams). In such a case, the video streams may be treated by the selector in the same way as if they had been received from separate devices.

In the embodiment described in relation to FIG. 3, at least two of the video streams are received at the control server from different instances of the communication client application, running on different user devices. That is, at least two of the video streams are received from different network endpoints having different network addresses (e.g. different IP addresses, or at least different transport addresses). For example, each of the video streams may be received from a different user terminal, where each of the different user terminals execute an instance of the communication client application (as is the case with streams s1, s2 and s3 shown in FIG. 3). For example, each instance of the communication client application may be different in the sense that a different user has logged into the communication client application to use it (e.g. using a unique username). In any case, the at least two of the video streams received at the control server are received from different instances of the communication client application, and not, for example, from different but co-located camera devices (i.e. all in a conference room), which may be connected to the network via a single instance of the communication client application.

In other cases, some of the streams may be received at the server from the same client. That is, a client may transmit more than one stream to the server allowing the server to select between different streams from the same client in the same manner.

For example, a single camera may stream multiple streams derived from a locally-captured "master" video image. For example, each stream may carry video image corresponding to a respective part of the master image (e.g. of different regions, different cropping's etc.). As another example, multiple camera feeds may be streamed via the network from one location to a shared virtual stage experience.

The network interface 314 is connected to a feature detection module 308, which may for example comprise a skeletal tracking module 308 and/or a facial detection module (not shown separately). The skeletal tracking module is configured to identify the skeletons of one or more users in one or more of the video streams received at the network interface. The skeletal tracking module may use the same process for identifying skeletons as Microsoft's Kinect sensor. The facial detection module is configured to detect the face(s) of any users in each video stream. In the example shown in FIG. 3, the feature detection module 308 receives video streams s1, s2 and s3, and determines whether any users (or rather, skeletons) are present in the respective video streams.

Having identified that one of the video streams is carrying an image of a user, the skeletal tracking module of the feature detection module 308 may forward information about the detected user in the corresponding video stream to a feature tracking module 310. This information may comprise an indication of where the "skeleton" of the user was identified within the moving image, for example corresponding to predetermined points on the user's body, e.g. corresponding to known skeletal points. Either way, this allows the feature tracking module 310 to identify particular human features within the moving image. For example, the identified "skeleton" of the user may provide a reference from which the feature tracking module can identify and track the movement of one or more human features. Alternatively or additionally, the facial detection module may provide information about the detected face(s) to the feature tracking module 310, allowing the latter to track the corresponding facial movements.

Human features may include, for example, the arm, hands, and/or face of a user. Human features may also include more specific human features such as the eyes, mouth and nose of a user. By tracking the movement of these features over the time, the feature tracking module 310 is able to detect and distinguish between different types of reaction that an identified user is having. For example, the feature tracking module 310 may be able to identify user reactions such as: smiling, laughing, frowning, gasping, head nodding, head shaking, hand waving, hand pointing, clapping, giving a thumbs up, raising or lowering their arms, celebrating with e.g. clenched fists etc.

The feature tracking module 310 may identify a user's reaction by comparing the movement of one or more identified human features with the entries of a database 304 storing predetermined, i.e. expected movements of the corresponding human features. The database of expected movements 304 may be stored in memory 302 at the control server.

For example, each expected movement may be defined by a set of parameters describing the movement of one or more human features. The feature tracking module 310 may determine the parameters describing the movement of one or more human features of an identified user and compare these to the parameters describing known, i.e. expected movements, to determine whether the user has performed an expected movement.

If the feature tracking module 310 determines that the identified user's movement of one or more human features corresponds to one of the expected movements in the database 304 the feature tracking module 310 may provide an indication that the expected movement has been detected, to a selector 312.

Selector 312 is configured to receive each of the plurality of video streams received at the network interface 314, and to determine which of these to cause to be displayed at one or more user terminals. In the example of FIG. 3, selector 312 is configured to determine which of the video streams s1, s2 and s3 to cause to be displayed as User D's user terminal (i.e. the receiving terminal).

Selector 312 is also configured to receive an indication from feature tracking module 310 of any expected movements, i.e. reactions, that have been detected in any of the video streams received at the selector 312. This indication is herein referred to as the "reaction indicator".

The reaction indicator may inform the selector 312 of any reactions" (i.e. expected movements) that were identified in one or more of the video streams received at the selector 312. This enables the selector 312 to determine which of the plurality of received video streams to select for display at a particular user's user terminal (in this example, user D's user terminal 6d).

The reaction indicator also enables the selector 312 to determine a time interval for which the video stream associated with that reaction should be displayed at a particular receiving terminal (again, in this example, user D's user terminal 6d). For example, the selector 312 may use the reaction indicator to query the entries of a database storing a list of pre-determined reactions and the time intervals for which those reactions should be displayed at a receiving terminal. The entries of such a database are shown in FIG. 4 (discussed later).

The selector 312 may for example, use the time interval associated with an identified reaction to determine the duration for which a selected video stream should be transmitted to a particular receiving terminal (e.g. user D's user terminal 6d).

The selector 312 may also use the reaction indicator to determine a priority associated with the identified reaction. For example, certain reactions may be deemed more worthy of display than others, and this may be indicated in the associated priority value (i.e. the higher the priority value, the more likely it is that the associated video stream is selected for display).

In a situation where reactions are detected in multiple video streams, but only a limited number of video streams can be displayed at a particular receiving terminal, the selector 312 may use the priority value associated with each of the detected reactions to determine which of the associated video streams to select for display at the receiving terminal.

The priority value may also determine the manner in which a selected video stream is displayed relative to any other video streams that are also selected for display at the receiving terminal (i.e. relative position and size).

Having determined which of the plurality of video streams to display at the receiving terminal (e.g. user D), the selector 312 may also select a particular layout for displaying the one or more selected video streams (streams s1 and s2 in FIG. 3).

The selector 312 may have stored in memory, a selection of grid layouts, and the selector 312 may select a particular grid layout for displaying the one or more selected video streams. The grid selected by the selector 312 may depend on the number of video streams that the selector 312 has selected for display at a particular user terminal. The moving images of the selected video streams may need to be cropped so as to be displayed at a particular location in the grid. For example, the one or more moving images may be cropped so as to display the most important information. The moving images may be cropped according to a tight, medium or wide view, depending on the detected expected movement and the selected grid layout.

Figure 9:
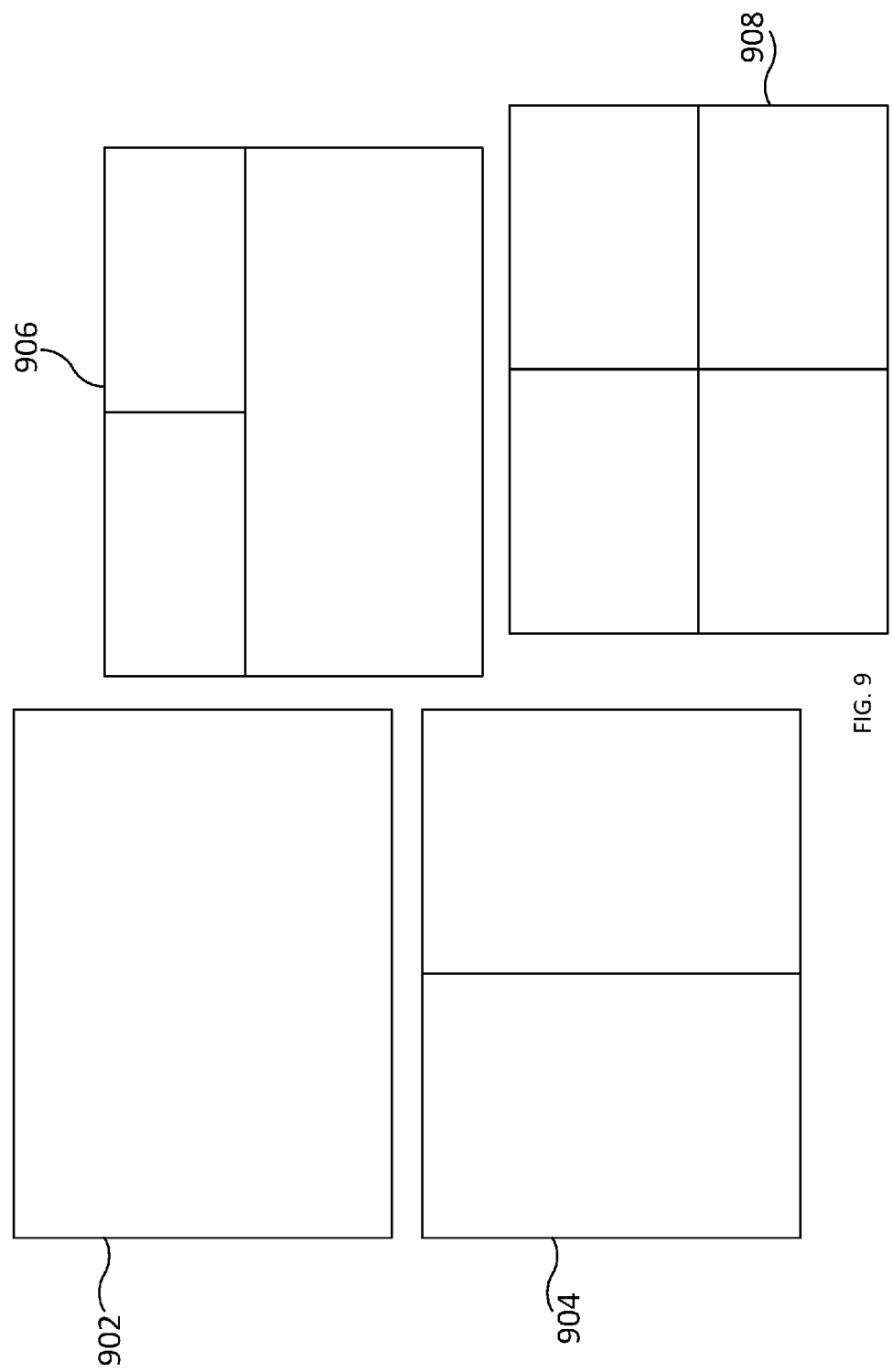
FIG. 9 schematically illustrates selectable predetermined layouts.

The selector 312 may also use the priority associated with the reaction identified in a selected video stream (based e.g. on whether a reacting or speaking user was detected) to determine where, within the selected grid layout, that video stream is to be displayed. Some examples of possible grid layouts are shown in FIG. 9. For example, grid layout 902 may be used to display a single video stream, grid layout 904 may be used to display two video streams simultaneously, grid layout 906 may be used to display three video streams simultaneously, and grid layout 908 to display four streams simultaneously. Whilst only four grid layouts are shown in FIG. 9, it will be appreciated that a grid layout may be selected so as to display any number of video streams. For example, a grid layout comprising five or more units may be selected to display four selected video streams. Whilst the grid layouts shown in FIG. 9 are all shown with rectangular units, the units of each grid may be of any shape and are not constrained so as to all be of the same shape.

For greater story continuity and fluid transitions between the different video streams that are displayed at the receiving terminal, the selector may be configured to ensure that there is a limited duration of time in which the units of the selected grid layout can be updated (i.e. a new video stream can be selected for display, at that unit of the grid).

For example, in one embodiment, the selector may ensure that only one unit of the selected grid is changed at a time—i.e. no new video streams are displayed at any of the other units of the grid, during the second time interval.

Alternatively, in a second embodiment, the selector may ensure that there is limited duration of time in which multiple units of the selected grid layout can be updated (i.e. to display the video streams in which a change in the number of users was detected). For example, following e.g. the selection of a first video stream, the selector may only allow other units of the selected grid to be updated, if these can be updated before the limited duration of time elapses.

These embodiments ensure that the least amount of video grid view updates occur within a designated duration of time, thereby making it as easy as possible for users to follow user activity within the Storied Experienced View. The selected grid and positioning of each of selected video streams within the grid may be indicated to the receiving user terminal (e.g. terminal 6d) in the form of layout parameters, as shown in FIG. 3. The receiving user terminal may interpret the layout parameters so as to display each of the selected video streams at their respective positions in the selected grid.

For example, referring to FIG. 3, the selector 312 may receive an indication that reactions were detected in streams s1 and s2 and based on this, select streams s1 and s2 for transmission to user 4d's user terminal. The selector 312 may select, for example, grid layout 904, shown in FIG. 9, and forward the corresponding layout parameters to the receiving terminal. In response to receiving the layout parameters, the receiving terminal may then render the two video streams such that the first video stream, s1, is displayed at a first location of the grid (e.g. the left-hand unit of the grid), and the second video stream, s2, is displayed at a second location of the grid (e.g. the right-hand unit of the grid). In some embodiments, it may not be necessary to send of all the layout parameters to the receiving terminal, if for example, there is no change in the number of video streams that are to be displayed at the receiving terminal (as described later in relation to FIGS. 7A and 7B).

Alternatively, the reaction indicator may indicate that a reaction was detected in stream s2 only. Based on this, the selector 312 may determine to increase the number of video streams displayed at user 4d's user terminal 6d, by continuing to transmit stream s1 (which was displayed at user 4d's user terminal 6d, prior to detecting a reaction from User 4B) and also transmitting stream s2 to User D. User D is thus be able to view the reaction of User B, in addition to the video of User A. In this particular example, user A may be for example, a speaking user, while user B is a reacting user, reacting to user A's speech. The control server may transmit layout parameters for grid layout 904, instead of the layout parameters for 902, which were previously used to display User A's video stream (as described later in relation to FIGS. 6A and 6C).

Continuity is important for the storied experience; if an event is tagged as relating to a certain location it may replace that location's current video stream location in the grid for the new duration timed event (i.e. the second time interval), whereas a newly promoted event may occupy an added grid location or grid escalation.

Stylized grid, duration and location playback may have unique rules for unique circumstances. For example, an end of meeting "montage" could display a series of related and unrelated events next to each other in the grid as a stylized reprise of the meeting event. For example, the duration timer for each event could be aligned or intentionally rhythmic to an audio track.

FIG. 4 shows a high-level representation of a database that may be used by the control server to determine a priority associated with a reaction identified in one or more of the received video streams. As can be seen in FIG. 4, a first column 402 of the database may contain entries for each expected "movement" (i.e. reactions). For example, M1 may correspond to "smiling", M2 may correspond to "head nodding", M3 may correspond to "head shaking", and so on and so forth.

A second column of the database 404 may contain entries for the priorities associated with each expected movement. For example, movement M1 (e.g. smiling) may have a priority value P1, which is higher or lower in value than the priority value P2 associated with movement M2 (e.g. head nodding). The priority values of each respective movement may be used to determine the manner in which video streams are displayed relative to one another. For example, a video stream featuring a higher-priority reaction may be displayed more prominently than a video stream featuring a lower-priority reaction. The priority values may be used, for example, to determine which of the units of a grid layout (such as those shown in FIG. 9) a selected video stream occupies.

The priorities may also be used to limit the number of video streams that are selected for display at a receiving terminal—for example, if reactions are detected in multiple video streams but only a limited number of video streams can be displayed (effectively) at a particular receiving terminal, the priority values may be used to determine which of those video streams are selected for display.

In certain embodiments, there may be a limit on the number of detection types that can occur within a certain duration of time, i.e. to control the amount of coverage that is displayed to a user within a specific duration of time. Over coverage of user activity may become disorienting to the user viewing it; it is therefore important to strike the balance between expanding the storied awareness of user activity whilst guarding against over coverage.

It will be appreciated that, whilst an individual priority value is shown for each expected movement, several movements may share the same priority value and be grouped according to this priority value. For example, rather than having a priority value associated with each movement, movements may be grouped according to e.g. the type of movement, and movements of the same "type" may share the same priority value. The "type" of a particular movement may determine its corresponding priority value.

A third column of the database 406 may contain entries for the time interval associated with each movement, that is, the time interval for which the video stream associated with that movement should be displayed at a receiving terminal. Different expected movements may be associated with different time intervals depending on the nature of the movement. For example, a movement that involves the movement of the whole of a user's body may have a time interval that is longer than a movement that corresponds to e.g. "smiling". The control server may use the time interval to determine when to stop transmitting the video stream associated with a particular movement, to a particular receiving terminal. Three types of time interval (i.e. durations) are described below.

Short Duration:

A set duration attached to a non-verbal event. Short would be set to a specific duration (example: 1.5 seconds). Allowing the priority assigned video to priority stack in the video story for consuming participants but not interrupt the active speaking audio signal. The active speaking audio signal would remain constant. Short will be assigned to participant activity that is added awareness but not essential at an extended activity. Including reaction shots: smiling, head nodding, head shaking, hand waving, hand pointing . . . ).

Medium Duration:

A set duration attached to a non-verbal event. Medium would be set to a specific duration (example: 2.5 seconds). Allowing the priority assigned video to priority stack the video story for consuming participants but not interrupt the active speaking audio signal. The active speaking audio signal would remain constant. Medium is assigned to specific activities deemed important to group activity awareness such as a change of body location in the room. Or a detection of a new body or person in the room (stand, sit, walk enter, leave a location).

Extended Duration:

The set duration for dominant activity participants. This duration is primarily assigned to active speaker. Giving active speaker the dominant story priority unless interrupted by a short duration story view or depreciated due to lack of speaking. An example of this is if story view is in single grid view and is an edge to edge video of active speaker. When a short or medium duration priority video is triggered to replace the active speaker video (but not the active audio) once the limited duration video has timed out it is replaced by the continuous active speaker video view that was populated at this location previously.

Persistent Duration:

The set duration for dominant activity participants. This duration is primarily assigned to a user pinned or view type that does not allow a video view to be interrupted. Thus duration is continuous until the user re-assigns the view or the meeting ends. This may take precedence over all other duration/non-verbal coverage types that normally would be assigned priority against this active view Non-verbal communication duration priority metric for: body, arm, hand, gesture, head, face and eye movement detection for story video priority metric. Duration priority metric works in conjunction with a playback durations library: short, medium, priority, and extended specification. As well as story grid location priority designated by a stack ranking of most recent activity, participant association or user preference.

For greater story continuity and fluid people engagement experiences the camera view grid updates should also be populated as a single or a group in a set duration of time whether it be from a single location or multiple locations. This is to ensure that the video playback is as fluid and noise-free as possible. It is also to ensure the least amount of video grid view updates occur within a designated duration of time, thereby allowing the story experience to be as engaging and easy to follow the action. It should also be noted that, for the durations described above, user or participant tagging may also influence the system priority stack. For example, a user may tag sensor data (video views) and a priority may be placed on those views for real-time story playback, recording, or editing after the event.

It will be appreciated that, whilst a separate column is shown in FIG. 4 for the priority and time interval of each respective movement, these two parameters may in fact be correlated (i.e. derivable from one another).

For example, the priority value of an expected movement may also determine the time interval for which it is displayed. For example, an expected movement with a higher priority value may be displayed for longer than an expected movement with a lower priority value. Alternatively, an expected movement with a lower-priority value may be displayed for a longer time interval.

Ultimately, any relationship between the priority value and time interval may be used. This relationship may allow time intervals to be determined 'on the fly' for each identified expected movement. That is, rather than storing a time interval for each of the possible expected movements in a database, the database may contain entries for the priority values only, and use these to determine the time interval associated with a particular movement, as and when that movement is identified within a particular video stream.

One or more other columns 408 of the database may contain entries pertaining to other parameters. For example, these parameters may relate to the grouping of different types of reactions, e.g. reactions involving hand movements may belong to a particular group, whilst reactions involving changes in a user's facial expression may belong to a different group. Each expected movement may be associated with a group value and expected movements sharing the same group value may be deemed to be of the same "type" (which may indicate that they share the same priority values and/or time intervals).

Additionally, the database may include a column for the parameters defining each expected movement. These parameters may define, for each expected movement, the corresponding changes in the relative positioning of a user's eyes, nose, mouth, eyebrows, hands etc. These parameters may also be associated with a margin of error—i.e. a range in which the relative positioning of a user's eyes, nose, mouth, eyebrows, hands etc. may change, and still be identified as corresponding to the respective expected movement.

Figure 5:
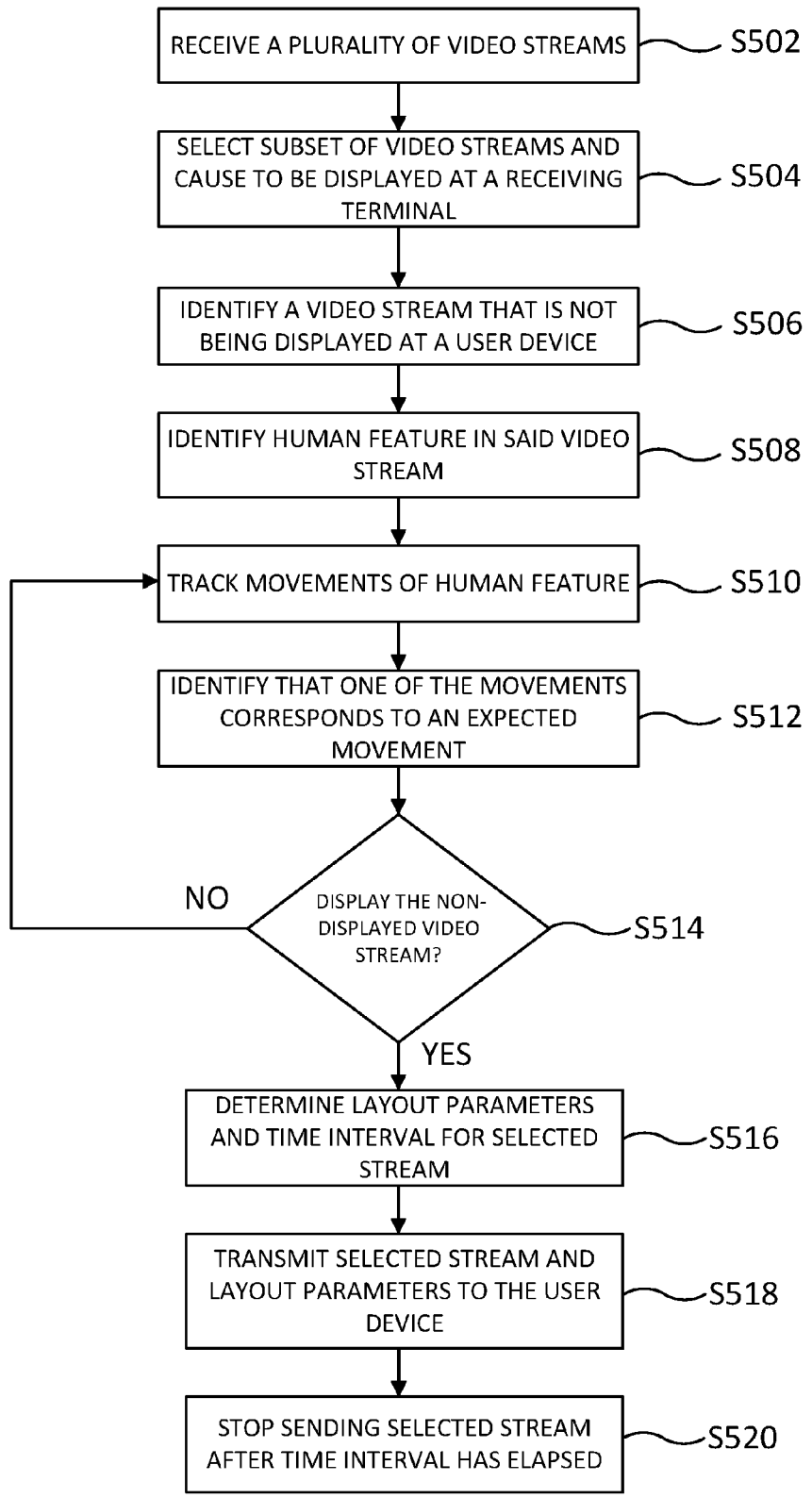
FIG. 5 shows a flow chart for a method of selecting video streams for displaying at a user device during a video call, based on the detection of an expected movement.

FIG. 5 illustrates a flowchart of the method performed at the control server for determining when to select a video stream for display at a receiving terminal (e.g. User D's user terminal).

It should be noted that, whilst FIG. 5 only shows a method for determining whether to select a single video stream for display at a receiving terminal, the control server may perform multiple instances of the described method, e.g in parallel, in order to determine whether a plurality of video streams should be selected for display at a receiving terminal.

At step, S502, a plurality of video streams are received at the control server (i.e. at the network interface of the control server). For example, these video streams may be received from the user terminals associated with users A, B and C. Alternatively, two or more of these video streams may be received from a single camera device, associated with two or more of users A, B and C.

At step S504, the control server selects a subset of the received video streams for display at the receiving terminal. The control server causes these video streams to be displayed at the receiving terminal, i.e. by transmitting them, along with any associated layout parameters, to the receiving terminal.

At step S506, the control server identifies a video stream that is not currently being displayed at the receiving terminal (herein referred to as "the identified video stream"). For example, each of the video streams received at the control server may include an indication of whether or not they are currently being displayed at the receiving terminal. The control server may use these indications to identify a video stream that is not currently being displayed at the receiving terminal.

Alternatively, a separate module within the control server (not shown in FIG. 3) may keep track of the video streams that were previously selected for display at the receiving terminal. This information may be used by the control server to identify a video stream that is not currently being displayed at the receiving terminal.

At step S508, the control server identifies one or more human features of the user identified within the identified video stream. As noted earlier in relation to FIG. 3, the feature detection module 308 may identify that a user is present in the identified video stream (e.g. based on skeletal and/or facial tracking) and a feature tracking module 310 may use this information to identify one or more human features of the identified user.

At step S510, the control server tracks the movement of the one or more identified human features. This may involve, for example, tracking the movement of a user's eyes and mouth, to determine whether the user is smiling or frowning etc.

At step S512, the control server identifies that the movement of the one or more human features corresponds to an expected movement, i.e. a known "reaction". As noted earlier in relation FIG. 3, this may involve determining parameters for the identified movement and comparing these with the parameters defining expected movements.

At step S514, the control server determines whether to cause the identified video stream to be displayed at the receiving terminal. If the control server determines that the identified video stream should not be displayed at the receiving terminal (indicated by 'NO' in FIG. 5), the control server continues to track the one or more identified human features of the user identified in the identified stream.

The control server may, for example, determine a priority value associated with the identified movement, and determine whether this value is higher than a priority value determined for a second video stream in which an expected movement was also identified. If, for example, the priority value of the expected movement in the identified stream is lower than the expected movement detected in the second video stream, the control server may determine that the identified video stream should not be displayed at the receiving terminal. If, whilst displaying the video stream in which an expected movement was detected, the audio of a new speaking user is detected, the control server may ensure that once the second time interval has elapsed, the video stream associated with the new speaking user is selected for display (and caused to be displayed) at the receiving terminal.

If the control server determines that the identified video stream should be displayed at the receiving terminal (indicated by 'YES' in FIG. 5), the control server selects the video stream for display at the receiving terminal.

At step S516, the control server determines the time interval for which the selected video stream should be displayed and any layout parameters that are needed in order to define the way in which the selected video stream will be displayed at the receiving terminal (e.g. relative to any other video streams that have been selected for display at the receiving terminal).

In one embodiment, the time interval associated with the selected video stream may be derived, for example, from the priority associated with the identified "expected movement". As noted earlier in relation to FIG. 3, each of the "expected movements" may be associated with a priority, and the priority may determine where, and for how long, the selected video stream is displayed at the receiving terminal.

At step S518, the control server transmits the selected video stream to the receiving terminal, along with any associated layout parameters. As noted earlier, the layout parameters are used by the receiving terminal to determine the manner in which the selected video stream is to be displayed.

At step S520, the control server detects that the time interval associated with the selected video stream has elapsed and stops sending the selected video stream. In response to the time interval elapsing, the control server may transmit new layout data to the receiving terminal, thereby ensuring that screen space is not allocated to video streams that are no longer being transmitted to the receiving terminal, from the control server.

FIG. 6A illustrates an example of a moving image of a user, user 604A, that may be displayed at the display of User D's user terminal, during a first time interval, during the video conference.

User 604A may be a user that has been determined to be important, based e.g. on a recent detection of the user's speech, or the user having initiated the video conference. This user is herein referred to as the "primary user", with an associated "primary video stream".

During the first time interval, the control server may determine that a second user has reacted to the actions performed by primary user 604A. For example, the control server may identify that a second user, herein referred to as the "reacting user" 604B, has smiled during the first time interval. In response to detecting the reacting user's smile, the control server may select the video stream associated with the reacting user for display at the receiving user's user terminal. This video stream is herein referred to as the "reacting user's video stream".

Figure 6B:
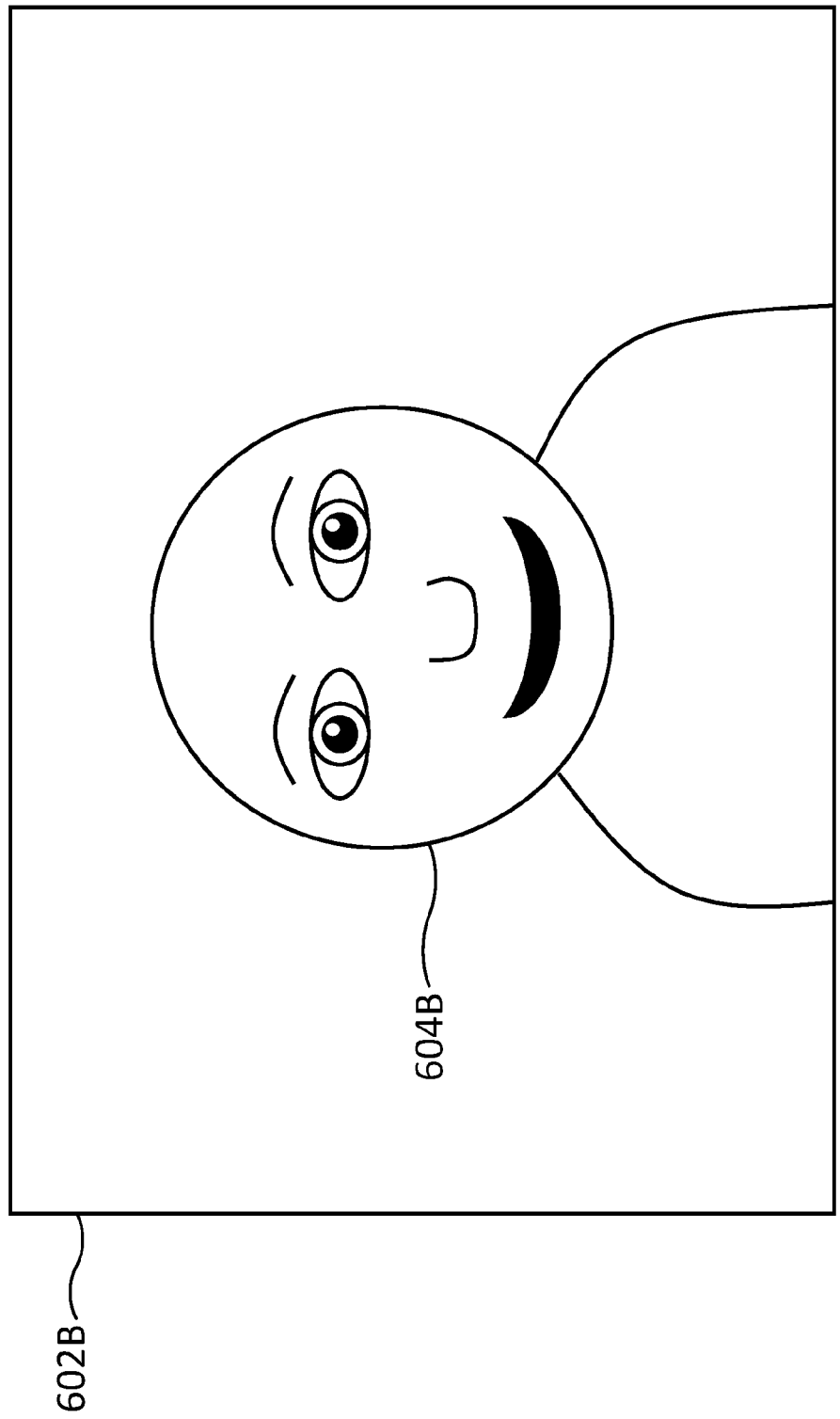

An example embodiment is illustrated in FIG. 6B, where the moving image of primary user 604A, has been replaced with the moving image of reacting user 604B. As noted earlier, the moving image of the reacting user is displayed for a predetermined time interval (the second time interval). The control server may ensure that the video of the primary user is not transmitted to User D, for the duration of this time interval.

The control server may also ensure that any audio (i.e. detected speech) associated with the primary user is still transmitted to User D. That is, the control server may treat the video and audio streams of each user (e.g. users A, B and C) separately, and only determine which of the video streams (and not audio streams) to select for display User D's user terminal. Hence, User D is able to continue to listen to the speech of the primary user, whilst also viewing the reactions of other users, as and when they occur.

When a single grid video view is streaming from a location and a new video priority type is detected, a duration type is assigned to that video depending on the detection type and it replaces the lower priority video stream. In most cases non-verbal communication is a video duration priority only. The audio priority stack preforms separately.

In an alternative embodiment, in response to determining that a second user has reacted to the actions performed by primary user 604A, the control server may continue to transmit the primary video stream to User D's user terminal, and also select the reacting user's video stream for transmission to (and subsequent display at) User D's user terminal. This may also include transmitting new layout parameters to User D's user terminal 6d—i.e. layout parameters that ensure that the two video streams are displayed using grid layout 904 (FIG. 9).

Figure 6C:
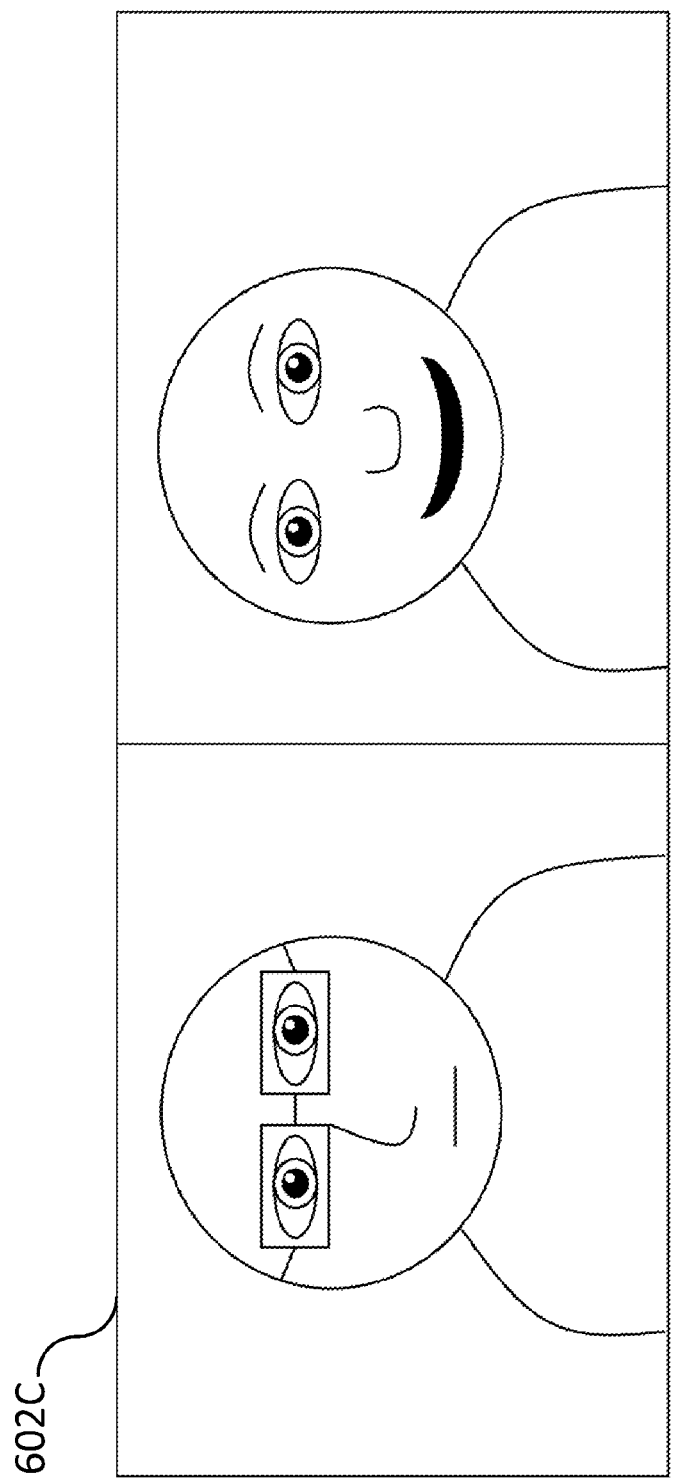

This is shown in FIG. 6C, where both the video streams of the primary and reacting user's are shown simultaneously, adjacent to one another, at the display of User D's user terminal. In this particular embodiment, User D is able to view both the primary user (who may be, for example a speaking user) as well as the reaction of user 604B (who may be reacting to what the primary user is saying).

Figure 7A:
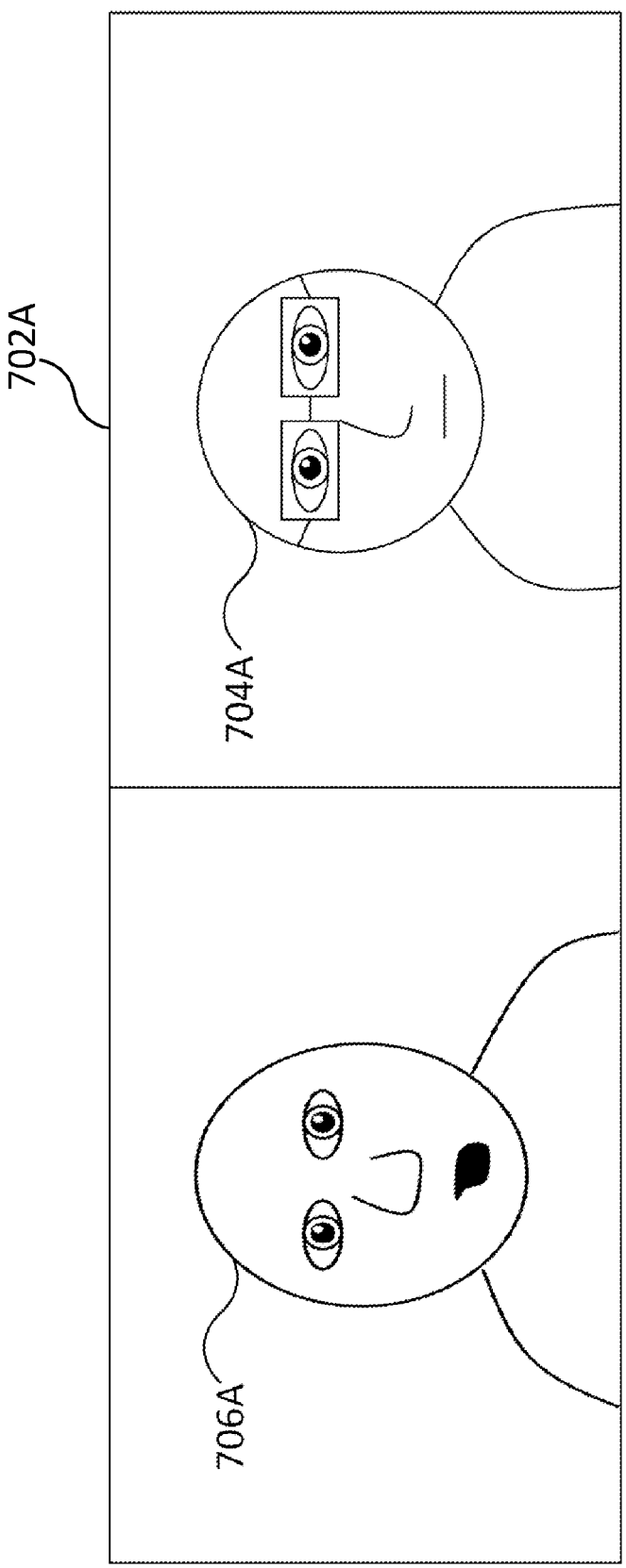

FIG. 7A shows an alternative embodiment in which two primary users may be displayed at the display of the receiving terminal, during a first time interval, during the video conference. This may occur, for example, where both of the primary users are determined as being of equal importance (for example, where audio data has been recently detected for both users). Alternatively, this may be a default setting for a receiving user that is in a video conference with two other users (as shown in FIG. 1).

Again, during the first time interval, the control server may identify that a third user—the reacting user, has smiled during the first time interval. In response to detecting the reacting user's smile, the control server may select the reacting user's video stream for display at the receiving terminal.

In this particular embodiment, the control server may cause one of the video streams displaying a second primary user, user 704A, to be replaced with the video stream associated with the reacting user, 704B. The control server may determine a relative priority of each of the video streams associated with the primary users (e.g. based on which of the two primary users spoke most recently), and based on this, select the video stream with the highest priority for display at the receiving terminal.

The control server may then continue to transmit the video stream associated with the highest priority to the receiving terminal, and also transmit the reacting user's video stream to the receiving terminal. This may involve sending new layout data to the receiving terminal, such that, in response to receiving the new layout data, the receiving terminal displays the video stream of a first primary user, user 604A, and the reacting user, 704B, in a particular arrangement at the receiving terminal.

Such an arrangement is illustrated in FIG. 7B, where the moving image of primary user 704A, has been replaced with the moving image of reacting user 704B. Again, the moving image of the reacting user is displayed for a predetermined time interval (the second time interval), which may be independent of the time interval for which the primary user, user 604A, is displayed at the receiving terminal.

FIG. 8 shows an alternative embodiment in which three primary users are displayed at the display of the receiving user's user terminal. In this embodiment, the video stream of a third primary user 804A is replaced with the video stream of a reacting user 804B. As in FIGS. 7A and 7B, each of the video streams may be associated with a priority, and the video stream with the lowest priority may be replaced with the video stream associated with the reacting user. Additionally, the reacting user's video stream may occupy a larger segment of the receiving terminal's display, depending on the priority associated with the identified reaction.

In the example of FIG. 8, the detected smile of the reacting user is of a high enough priority to replace the video of e.g. an inactive user, but not a high enough priority to replace the video of a speaking user, such as user 804A.

It will be appreciated that while FIG. 8 is described in the context of replacing one of three primary video streams with a reacting user's video stream, any number of the three primary video streams may be replaced with the video streams of a reacting user (depending on the number of participants in the video conference, and the number reacting users etc.).

It will also be appreciated that, if the control server causes an increase in the number of video streams that are displayed at a receiving terminal, then any number of reacting users may be displayed in addition to the one or more primary users.

For example, if a primary user is displayed in a first window 602A, and a reaction is identified in the video streams of two other users, the first window 602A may be updated so as to display the video stream of the primary speaker, as well as the video streams of the two other reacting users. This may involve transmitting new layout parameters from the control server to the receiving terminal, e.g. layout parameters that enable the video streams to be displayed using grid layout 906 (FIG. 9) instead of grid layout 902 (FIG. 9).

For example window 602A may be replaced with a window akin the display window 802B shown in FIG. 8B, but with a reacting user displayed in each of the two smaller segments of the display window. The two reacting user's video streams may be displayed for the same or different time intervals, depending on the reaction identified in each of the video streams (e.g. whether they both belong to a group of reactions that share the same or similar time intervals).

In an alternative embodiment, the control server may increase the number of video streams that are displayed at a receiving terminal, such that a display window showing two primary users (e.g. the display window shown in FIG. 7A) is updated so as to also display the video stream of a reacting user (e.g. the display window shown in FIG. 8B), in addition to the video streams of the two primary users.

When a multi-grid video story view is streaming for group activity and a new video priority type is detected, a duration type is assigned to that new video depending on the detection type. The duration type determines how long the singular priority will last until the priority is reset to the current detected participant activity or is overruled by a higher priority video. In a multi-grid scenario, the least active video is replaced by the new duration type priority video, unless it is tagged as related to a specific location or participant, in which case, it replaces the grid view of that same participant or location feed for only the specified time to maintain story continuity.

In a broadcast or presentation experience, the audience consuming the broadcast or presentation may have less awareness of the reactions of the other users consuming broadcast or presentation, whilst e.g. the presenting user may have more awareness of the reactions of the users consuming his/her presentation.

Generally, unless otherwise indicated, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

According to a first aspect, the subject matter of present application provides a computer-implemented method of effecting a communication event between a first user and one or more second users via a communication network, the method comprising implementing on a computer connected to the network: receiving, via the network, a plurality of video streams, each carrying a respective moving image of at least one respective user; causing the respective moving image of a first of the video streams to be displayed at a user device of the first user for a first time interval; identifying in the respective moving image of a second of the video streams that is not displayed at the user device in the first time interval, a human feature of the respective user; detecting a movement of the identified human feature during the first time interval that matches one of a plurality of expected movements; and in response to the detected movement, causing the respective moving image of at least the second video stream to be displayed at the user device for a second time interval.

In embodiments, the computer may determine the duration of the second time interval based on which of the plurality of expected movements the movement of the identified human feature is detected as matching.

Each of the plurality of expected movements may be associated with a priority value, and the computer may use the priority value to select the second stream from the plurality of video streams for said displaying at the user device for the second time interval.

The computer may be embodied in a server.

Alternatively, the computer may be embodied in the user device.

In some embodiments, causing at least the second video stream to be displayed at the user device may comprise replacing the first video stream with the second video stream, such that the first video stream is not displayed at the user device for the second interval.

In other embodiments, both the first and second video streams may be displayed at the user device for the second interval.

The computer may be separate from the user device and the computer may cause the moving image of each of the first and second video streams to be displayed at the user device, by transmitting that stream to the user device via the network for displaying thereat.

In further embodiments, a third video stream may be displayed at the user device in the first time interval in addition to the first video stream and the third video stream may be replaced with the second video stream for the second interval, such that the third video stream is not displayed at the user device for the second interval.

The computer implemented method of the first aspect may also include: in response to detecting said movement, selecting a first of a plurality of predetermined layouts for displaying at least the second video stream at the user device for the second time interval, wherein each of the plurality of predetermined layouts is for displaying a different number of video streams at the user device, wherein a different one of the predetermined layouts is used to display the first stream in the first time interval.

In some embodiments, the computer implemented method may cause audio data associated with the first video stream to be played out at the user device during both the first and the second time intervals. The audio data may be played out in the first and second time intervals in response to the computer detecting that the user in the moving image of the first video stream is speaking.

In further embodiments, at least two of the plurality of streams may be received from different communication client instances, each of the different communication client instances being executed at a different user device. Each of the video streams may be received from a different communication client instance executed on a different user device.

According to a second aspect, the subject-matter of the present application provides computer for effecting a communication event between a first user and one or more second users via a communication network, the computer comprising: a network interface configured to receive, via the network, a plurality of video streams, each carrying a respective moving image of one or more users; a processor configured to perform operations of: causing the respective moving image of a first of the video streams to be displayed at a user device of the first user for a first time interval; identifying in the respective moving image of a second of the video streams that is not displayed at the user device in the first time interval, a human feature of the respective user; detecting a movement of the identified human feature during the first time interval that matches one of a plurality of expected movements; and in response to the detected movement, causing the respective moving image of at least the second video stream to be displayed at the user device for a second time interval.

The computer may determine the duration of the second time interval based on which of the plurality of expected movements the movement of the identified human feature is detected as matching.

Each of the plurality of expected movements is associated with a priority value, and the computer uses the priority value to select the second stream from the plurality of video streams for said displaying at the user device for the second time interval.

At least one of the plurality of expected movements may corresponds to the user in the moving image of the second video image: smiling, frowning, laughing, gasping, nodding their head, shaking their head, pointing in a particular direction with one or both of their hands, waving with one or both of their hands, raising or lowering one or both of their arms above or below a predetermined height, clapping, moving one or more clenched fists (i.e. so as to indicate celebration or frustration), and giving a thumbs up or down with one or both of their hands.

The computer of the second aspect may also include a processor configured to perform the operation of: in response to detecting said movement, selecting a first of a plurality of predetermined layouts for displaying at least the second video stream at the user device for the second time interval, wherein each of the plurality of predetermined layouts is for displaying a different number of video streams at the user device, wherein a different one of the predetermined layouts is used to display the first stream in the first time interval.

According to a third aspect, the subject-matter of the present application provides a computer program product for effecting a communication event between a first user and one or more second users via a communication network, the computer program product comprising code stored on a computer readable storage medium and configured when executed on a computer to perform the following operations: receiving, via the network, a plurality of video streams, each carrying a respective moving image of one or more users; causing the respective moving image of a first of the video streams to be displayed at a user device of the first user for a first time interval; identifying in the respective moving image of a second of the video streams that is not displayed at the user device in the first time interval, a human feature of the respective user; detecting a movement of the identified human feature during the first time interval that matches one of a plurality of expected movements; and in response to the detected movement, causing at least the second video stream to be displayed at the user device for a second time interval.

In embodiments of any one of the above aspects, features of any embodiment of any other of the aspects may be implemented.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method of effecting a communication event between a first user and one or more second users via a communication network, the method comprising:
   receiving, via the communication network, a plurality of video streams, each of the video streams carrying a respective moving image of at least one respective user;
   causing the respective moving image of a first of the video streams to be displayed at a user device of the first user for a first time interval;
   identifying in the respective moving images of one or more of the other video streams a human feature of the respective user;
   detecting a movement of one or more of the identified human features during the first time interval that matches one of a plurality of expected movements, each of the plurality of expected movements associated with a priority value;
   selecting one of the one or more of the other video streams based on the priority value associated with the expected movements; and
   causing the respective moving image of the selected video stream to be displayed at the user device for a second time interval.

2. The method of claim 1, wherein a duration of the second time interval is determined based on which of the plurality of expected movements the movement of the identified human feature is detected as matching.

3. The method of claim 1, wherein causing the selected video stream to be displayed at the user device comprises replacing the first video stream with the selected video stream, such that the first video stream is not displayed at the user device for the second interval.

4. The method of claim 1, wherein both the first and selected video streams are displayed at the user device for the second interval.

5. The method of claim 1 wherein a second video stream is displayed at the user device in the first time interval in addition to the first video stream and the second video stream is replaced with the selected video stream for the second interval, such that the second video stream is not displayed at the user device for the second interval.

6. The method of claim 1, comprising, in response to detecting said movement, selecting a first of a plurality of predetermined layouts for displaying at least the selected video stream at the user device for the second time interval, wherein each of the plurality of predetermined layouts is for displaying a different number of video streams at the user device, wherein a different one of the predetermined layouts is used to display the first stream in the first time interval.

7. The method of claim 1, comprising causing audio data associated with the first video stream to be played out at the user device during both the first and the second time intervals.

8. The method of claim 7, wherein the audio data is played out in the first and second time intervals in response to detecting that the user in the moving image of the first video stream is speaking.

9. The method of claim 1, wherein at least two of the plurality of streams are received from different communication client instances, each of the different communication client instances being executed at a different user device.

10. The method of claim 9, wherein each of the video streams is received from a different communication client instance executed on a different user device.

11. The method of claim 1, wherein a computer separate from the user device causes the moving image of each of the first and selected video streams to be displayed at the user device, by transmitting that stream to the user device via the network for displaying thereat.

12. The method of claim 11, wherein the computer is embodied in a server.

13. The method of claim 1, wherein the plurality of expected movements comprises at least one of smiling, frowning, laughing, gasping, a head nod, a head shake, pointing in a particular direction with one or both hands, waving with one or both hands, raising or lowering one or both arms above or below a predetermined height, clapping, moving one or more clenched fists, or giving a thumbs up or down with one or both hands.

14. A computer for effecting a communication event between a first user and one or more second users via a communication network, the computer comprising:
   a network interface configured to receive, via the communication network, a plurality of video streams, each of the video streams carrying a respective moving image of at least one respective user;

a processor configured to perform operations of:

causing the respective moving image of a first of the video streams to be displayed at a user device of the first user for a first time interval;

identifying in the respective moving images of one or more of the other video streams a human feature of the respective user;

detecting a movement of one or more of the identified human features during the first time interval that matches one of a plurality of expected movements, each of the plurality of expected movements associated with a priority value; and causing the respective moving image of the selected video stream to be displayed at the user device for a second time interval.

15. The computer of claim 14, wherein the computer determines a duration of the second time interval based on which of the plurality of expected movements the movement of the identified human feature is detected as matching.

16. The computer of claim 14, wherein the processor is further configured to perform operations comprising, in response to detecting said movement, selecting a first of a plurality of predetermined layouts for displaying at least the selected video stream at the user device for the second time interval, wherein each of the plurality of predetermined layouts is for displaying a different number of video streams at the user device, wherein a different one of the predetermined layouts is used to display the first stream in the first time interval.

17. The computer of claim 14, wherein the plurality of expected movements comprises at least one of smiling, frowning, laughing, gasping, a head nod, a head shake, pointing in a particular direction with one or both hands, waving with one or both hands, raising or lowering one or both arms above or below a predetermined height, clapping, moving one or more clenched fists, or giving a thumbs up or down with one or both hands.

18. A computer program product for effecting a communication event between a first user and one or more second users via a communication network, the computer program product comprising code stored on a computer readable storage medium and configured when executed on a computer to perform the following operations:

receiving, via the communication network, a plurality of video streams, each of the video streams carrying a respective moving image of at least one respective user;

causing the respective moving image of a first of the video streams to be displayed at a user device of the first user for a first time interval;

identifying in the respective moving images of one or more of the other video streams a human feature of the respective user;

detecting a movement of one or more of the identified human features during the first time interval that matches one of a plurality of expected movements, each of the plurality of expected movements associated with a priority value; and causing the respective moving image of the selected video stream to be displayed at the user device for a second time interval.

19. The computer program product of claim 18, wherein a duration of the second time interval is determined based on which of the plurality of expected movements the movement of the identified human feature is detected as matching.

20. The computer program product of claim 18, wherein the plurality of expected movements comprises at least one of smiling, frowning, laughing, gasping, a head nod, a head shake, pointing in a particular direction with one or both hands, waving with one or both hands, raising or lowering one or both arms above or below a predetermined height, clapping, moving one or more clenched fists, or giving a thumbs up or down with one or both hands.

* * * * *